(12) United States Patent
Brady et al.

(10) Patent No.: US 7,379,181 B2
(45) Date of Patent: May 27, 2008

(54) STRUCTURED CODED APERTURE FIBER BUNDLES

(75) Inventors: David J. Brady, Durham, NC (US); Prasant Potuluri, Raleigh, NC (US); Michael E. Sullivan, Raleigh, NC (US)

(73) Assignee: Centice Corporation, Morrisville, NC (US)

( * ) Notice: Subject to any disclaimer, the term of this patent is extended or adjusted under 35 U.S.C. 154(b) by 105 days.

(21) Appl. No.: 11/421,903

(22) Filed: Jun. 2, 2006

(65) Prior Publication Data

US 2007/0165220 A1    Jul. 19, 2007

Related U.S. Application Data

(63) Continuation-in-part of application No. 11/334,546, filed on Jan. 19, 2006, now Pat. No. 7,301,625.

(60) Provisional application No. 60/792,118, filed on Apr. 14, 2006.

(51) Int. Cl.
*G01J 3/04* (2006.01)
*G01J 3/12* (2006.01)

(52) U.S. Cl. ...................... 356/326; 356/310

(58) Field of Classification Search ............. 356/310, 356/326, 328, 330
See application file for complete search history.

(56) References Cited

U.S. PATENT DOCUMENTS

| | | | | |
|---|---|---|---|---|
| 3,590,248 A | * | 6/1971 | Chatterton, Jr. | 398/91 |
| 4,259,014 A | * | 3/1981 | Talmi | 356/328 |
| 5,690,894 A | * | 11/1997 | Pinkel et al. | 506/23 |
| 6,995,840 B2 | | 2/2006 | Hagler | |
| 7,061,606 B2 | | 6/2006 | Treado et al. | |
| 7,242,468 B1 | * | 7/2007 | Zhang | 356/301 |
| 7,253,897 B2 | | 8/2007 | Moon et al. | |

OTHER PUBLICATIONS

McCain, S.T. et al. "Multimodal Multiplex Raman Spectroscopy Optimized for In Vivo Chemometrics." SPIE—The International Society of Optical Engineering, believed to be published online Feb. 27, 2006, vol. 6093.

* cited by examiner

*Primary Examiner*—F. L Evans

(57) ABSTRACT

A spatial filter for an optical system, such as an optical spectrometer, collects and spatially filters light using a fiber bundle having a plurality of fibers disposed therein. At an input end of the fiber bundle, the fibers are typically packed tightly together to optimize the collection efficiency. At an output end, the fibers are spread out from the fiber bundle and arranged within a two-dimensional output area according to a two-dimensional pattern corresponding to a coded aperture function. As a result, the two-dimensional pattern of the output end spatially filters the light collected by the input end. Corresponding methods are also described.

48 Claims, 7 Drawing Sheets

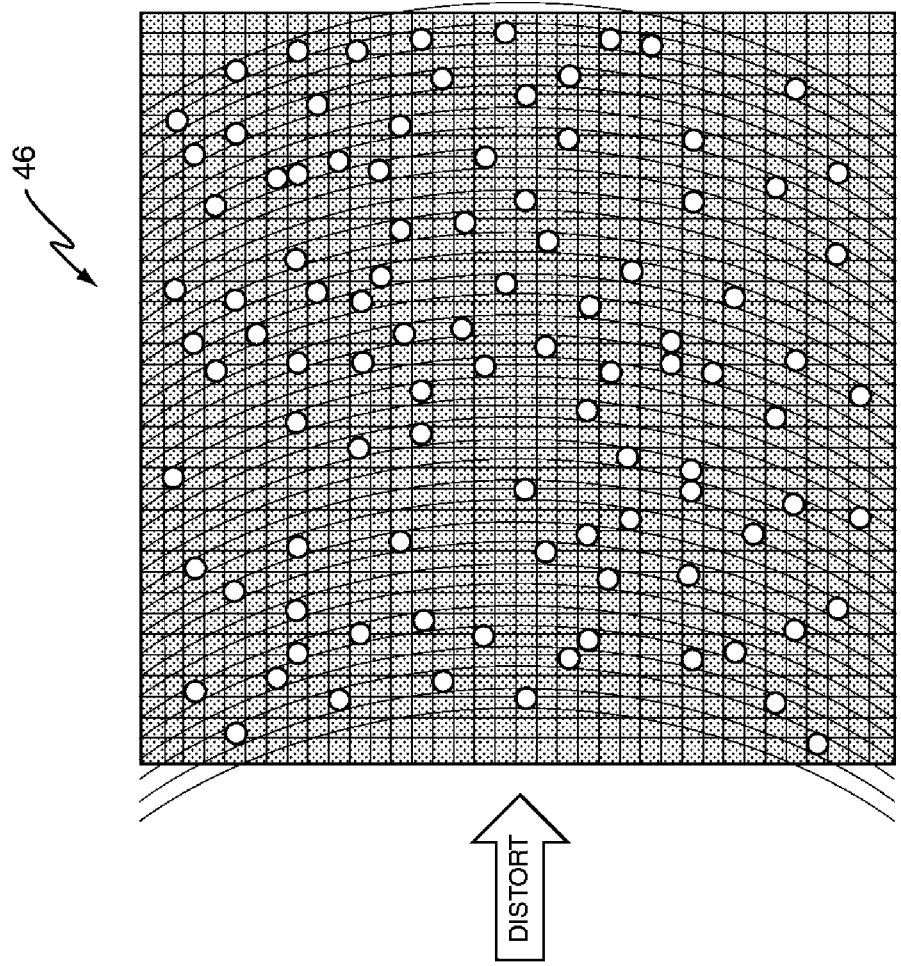
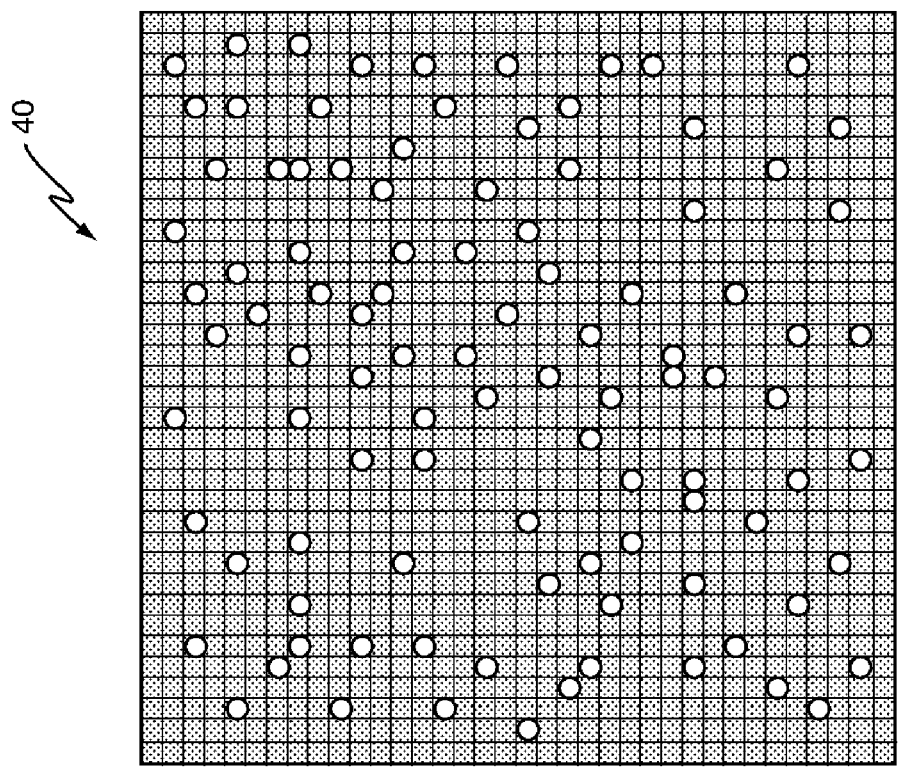
FIG. 7

STRUCTURED CODED APERTURE FIBER BUNDLES

This patent is a continuation-in-part of U.S. patent application Ser. No. 11/334,546, entitled "Two-Dimensional Orthogonal Column Multimodal Spectrometer and Spectral Imager," filed 19 Jan. 2006, now U.S. Pat. No. 7,301,625 and further claims priority to U.S. Provisional Application Ser. No. 60/792,118, entitled "Multiple Diffraction Order Coded Aperture Spectroscopy," filed 14 Apr. 2006, both of which are incorporated herein by reference in their entirety.

BACKGROUND

Optical spectrometers collect and process light radiated from a sample to measure wavelength-specific properties of the sample. Typically, a spectrometer includes a collection/filter system, a grating, and a detector array. The collection/filter system captures a percentage of the light radiated from the sample and spatially filters the collected light. The grating spatially shifts different wavelength components of the incident light to different areas of the detector array, while detectors in the detector array convert sensed light to an electrical output signal. Processing electronics connected to the detector array quantify wavelength-specific properties of the sample based on the output signals from the detector array.

Conventional collection/filter systems typically use collection optics and a separate spatial filter, such as a pinhole or slit. Size constraints imposed on the optical spectrometer and components within the optical spectrometer necessarily limit the numerical aperture of the collection optics. Because the amount of radiated sample light collected by the collection optics is directly related to the numerical aperture, these size constraints also necessarily limit the collection efficiency of the collection optics. Further, the combination of the collection optics with the spatial filter places strict optical and mechanical requirements on the design of the optical spectrometer. Therefore, there remains a need for alternative collection/filter systems for use in optical spectrometers.

SUMMARY

The present invention provides a spatial filter comprising a fiber bundle having a plurality of fibers that collect and filter incident light. At an output end, the fibers are arranged according to a two-dimensional pattern corresponding to a coded aperture function. By arranging the output end according to the two-dimensional pattern, the fiber bundle spatially filters incident light collected by the input end. An additional filter may be disposed proximate the output end of the fiber bundle to further filter the light if desired. In addition, the output and input ends of the fiber bundle advantageously also occupy different sized areas, with the input end being smaller in area than the output end.

According to one exemplary embodiment, an optical spectrometer uses the inventive spatial filter to collect light radiated from a sample and to spatially filter the collected light. A dispersion system disposed between the spatial filter and a detector array shifts images of the two-dimensional pattern in a wavelength dependent fashion onto the detector array. A processor processes one or more output signals corresponding to one or more detected images to identify one or more spectral characteristics of the light radiated from the sample.

BRIEF DESCRIPTION OF THE DRAWINGS

FIG. 7 shows a representation of an exemplary spatial filter output end before and after applying a distortion compensation function.

DETAILED DESCRIPTION

The spatial filter described herein may be used in a wide variety of optical systems, including optical spectrometers. As such, the following first generally describes an exemplary optical spectrometer, one that advantageously uses the inventive spatial filter, so that the present invention may be understood in the context of a typical application.

Figure 1:
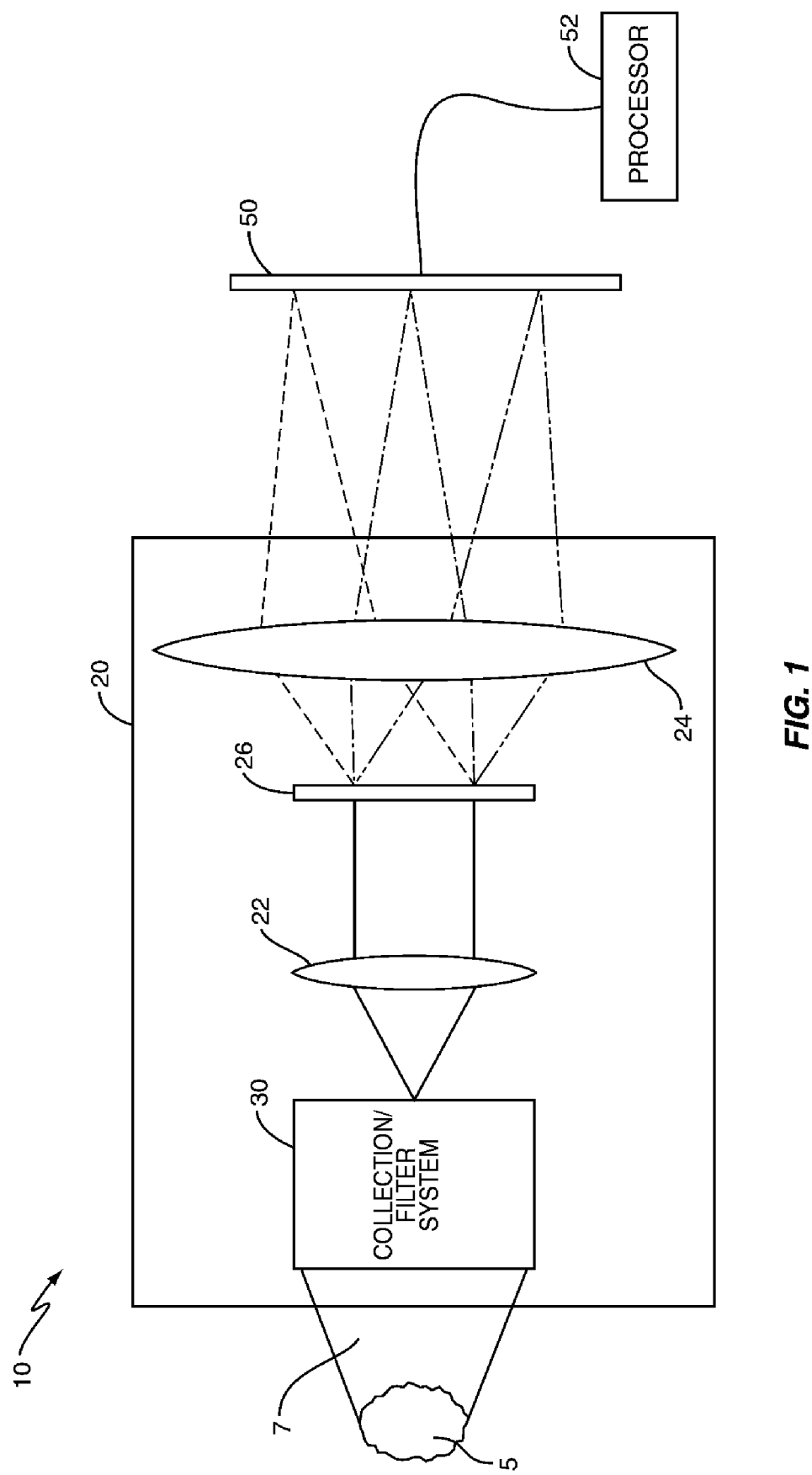
FIG. 1 shows a block diagram of one exemplary optical spectrometer according to the present invention.

FIG. 1 illustrates an exemplary multiple diffraction order optical spectrometer, generally indicated at 10. Spectrometer 10 includes an optical system 20, a two-dimensional detector array 50, and a processor 52. Optical system 20 includes a collection/filter system 30, one or more lens systems 22, 24, and a dispersion system 26. Collection/filter system 30 collects incident light 7 radiated from a sample 5 and spatially filters the incident light 7 according to a coded aperture function associated with a pre-determined coded aperture, as discussed further below. A first lens system 22 collimates the filtered light from the collection/filter system 30 before passing the filtered light to dispersion system 26. Dispersion system 26 disperses multiple orders of the collimated light in two dimensions according to the light's constituent wavelength components. A second lens system 24 focuses the dispersed light onto the detector array 50. Operatively, first and second lens systems 22, 24 image the coded aperture of the collection/filter system 30 onto the detector array 50, while dispersion system 26 positions the images of the coded aperture associated with different wavelengths on different portions of the detector array 50.

Two-dimensional detector array 50 advantageously takes the form of an orderly array of individual detectors. The detectors in detector array 50 sense the intensity of the light incident on the detector array 50 and convert the detected intensity into an output electrical signal. The detector array 50 provides each detector's output electrical signal to the processor 52.

Processor 52 processes one or more of the detector output signals using an analysis function that complements the coded aperture function. In so doing, processor 52 extracts wavelength-specific information about sample 5 from the detected light. Processor 52 may be implemented in a single microprocessor or in multiple microprocessors. Suitable microprocessors may include, for example, both general purpose and special purpose microprocessors and digital signal processors. Further, the operations executed by processor 52 may be embodied in hardware and/or in software, including firmware, resident software, micro-code, etc. Further, the logic circuits of processor 52 may be integrated within the optical spectrometer 10, placed in an external computer linked to the optical spectrometer 10, or any combination thereof.

Conventional collection/filter systems typically collect and filter the light using separate collection and filter elements, such as one or more collection lenses and a separate spatial filter, respectively. The present invention replaces these separate bulk components with a fiber optic collection/filter system 30, also referred to herein as spatial filter 30. As discussed further below, some embodiments of the fiber optic collection/filter system 30 described herein advantageously improve the efficiency and reduce size restrictions associated with collecting and filtering radiated light 7.

Figure 2:
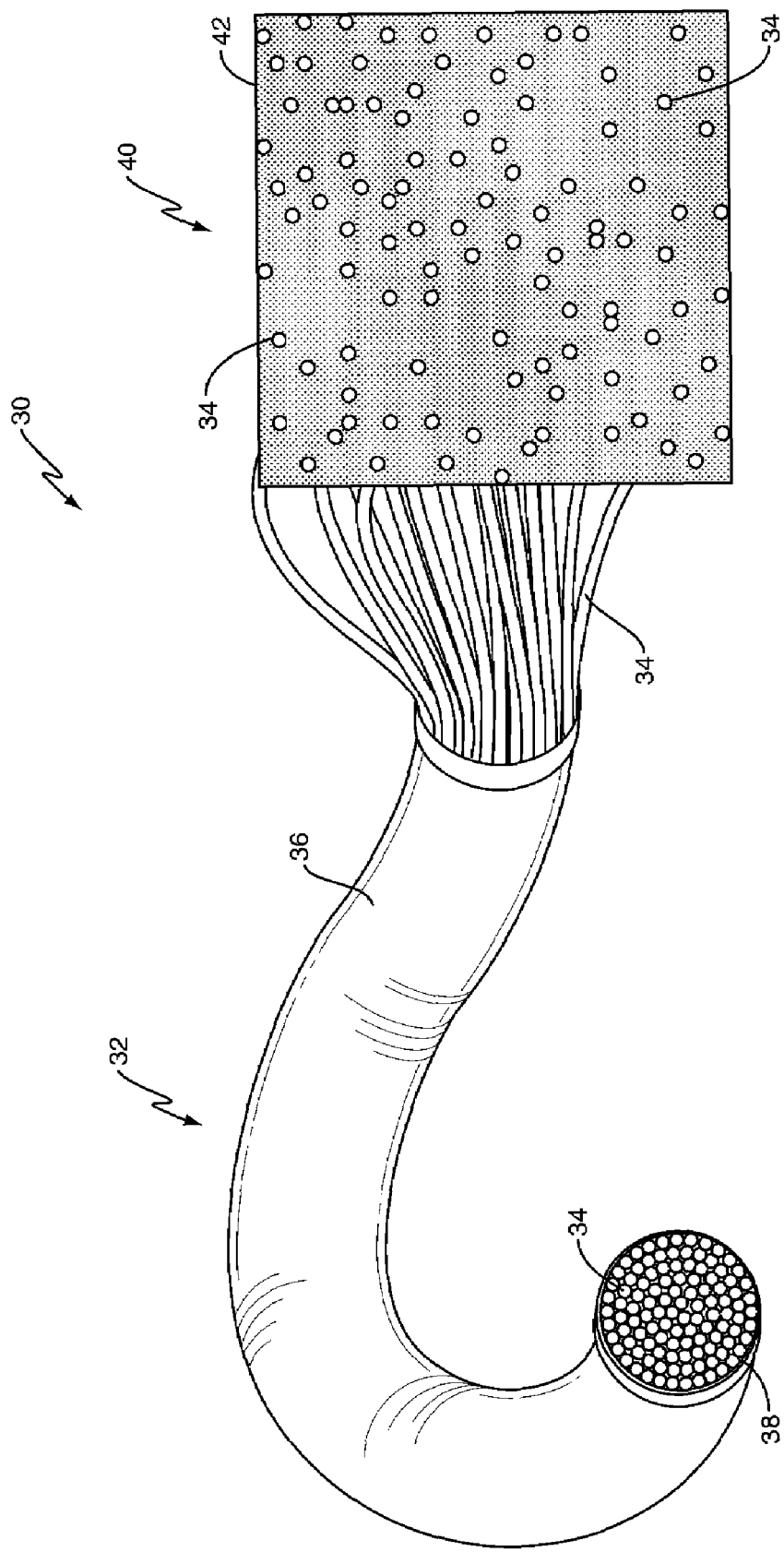
FIG. 2 shows one exemplary collection/filter system according to the present invention.

FIG. 2 illustrates one exemplary collection/filter system 30 made from a fiber bundle 32. The fiber bundle 32 includes a plurality of optical fibers 34 contained within a fiber bundle jacket 36 that extend from input end 38 to output end 40. At the input end 38, the fiber bundle jacket 36 confines the fibers 34 to an input area. In one exemplary embodiment, the fibers 34 are tightly packed into a circular area at the input end 38 to minimize the input area, and therefore to optimize the collection efficiency. While the figures illustrate a generally circular input end 38, it will be appreciated that input end 38 may conform to any shape.

Figure 3:
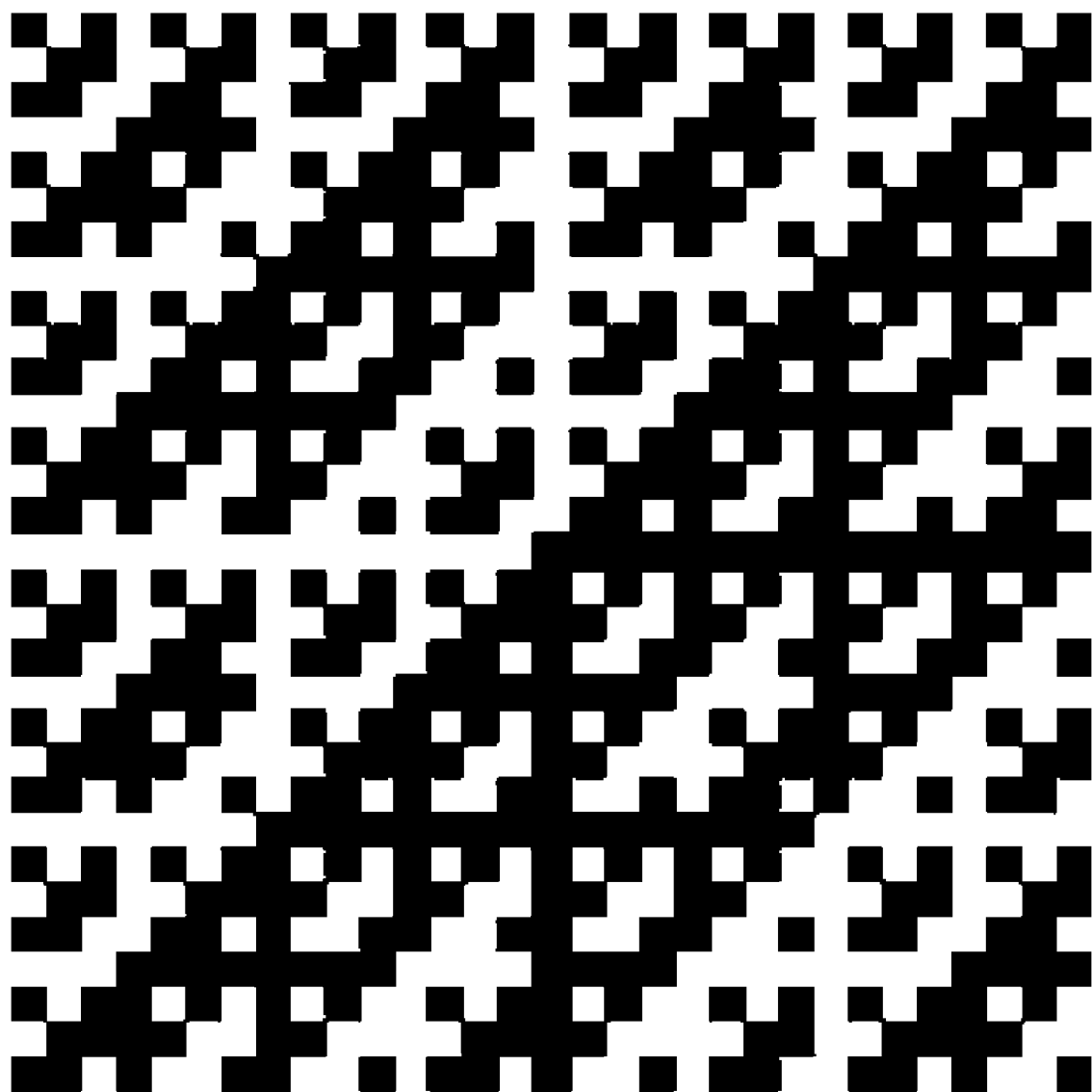
FIG. 3 shows one exemplary two-dimensional pattern for the spatial filter of FIG. 2.

At the output end 40 of the fiber bundle 32, the plurality of fibers 34 branch out from the jacket 36, and are arranged within a second, larger output area, according to a two-dimensional pattern 42 corresponding to a pre-determined coded aperture function. According to the present invention, at least one column of the two-dimensional pattern 42 includes at least two fibers 34 from the fiber bundle 32 and at least one row of the two-dimensional pattern 42 includes at least two fibers 34 from the fiber bundle 32. As used herein, the term "coded aperture function" refers to any function that defines a coded aperture having a plurality of transmissive and non-transmissive areas arranged within a two-dimensional space, where each column of the two-dimensional space is orthogonal under an inner product transformation. FIG. 3 illustrates one exemplary coded aperture defined by a Hadamard coded aperture function. Additional exemplary coded aperture functions include Golay functions, Unified Redundant Arrays (URA), Modified URA (MU RA), orthogonal/independent column codes, and/or any combination thereof. For example, U.S. patent application Ser. No. 11/334,546 describes exemplary coded aperture functions applicable to the present invention. In the collection/filter system 30 described herein, the fibers 34 at output end 40 represent the transmissive areas of the coded aperture, while the areas between the fibers 34 represent the non-transmissive areas of the coded aperture. As a result, the output end 40 of fiber bundle 32 operates as a coded aperture that spatially filters the light collected by the input end 38.

Fiber bundle 32 may contain any desired number of fibers 34. Generally, the number of fibers 34 will be defined by the number of transmissive areas required for a desired coded aperture. One exemplary collection/filter system 30 includes 400-500 fibers, where each fiber corresponds to a different transmissive area of the coded aperture. It will be appreciated that some embodiments may use multiple fibers 34 to create each transmissive area, and that such embodiments include a larger number of fibers 34 in the fiber bundle 32.

As discussed above, the area of input end 38 differs from the area of output end 40. The fibers 34 at input end 38 of one exemplary embodiment are tightly packed together to optimize collection efficiency. At output end 40, fibers 34 are spaced within a two-dimensional area according to the two-dimensional pattern 42 to create the transmissive areas of the coded aperture. As a result, output end 40 has a larger area than input end 38. For example, when a square two-dimensional pattern 42 has a 50% fill factor, output end 40 is larger than input end 38 by approximately $\sqrt{2}$. It will be appreciated, however, that other fill factors are also applicable and that the fill factor is defined by the coded aperture function. Further, it will be appreciated that the fibers 34 at input end 38 do not have to be tightly packed within the fiber bundle jacket 36. As such, while output end 40 will have a larger area than input end 38, other size ratios may define the size difference between the input and output ends 38, 40.

To make the fiber bundle 32, the fibers 34 at input end 38 are secured within the fiber bundle jacket 36, while the fibers 34 at output end 40 are spaced apart, arranged according to the two-dimensional pattern 42, and secured in place. Any web-like device may be used to arrange the fibers 34 in the desired pattern 42. For example, a mesh may be used to arrange each fiber 34 within a two-dimensional area according to the desired two-dimensional pattern 42. To ensure that the fibers 34 do not later move within the mesh, any known fastening means, such as an adhesive, may be used to affix the fiber ends to the mesh, and therefore, to affix the fibers in the desired location. Examples of suitable adhesives include optical adhesives from Norland Products, Inc. of Cranbury, N.J.; adhesives from Master Bond, Inc. of Hackensack, N.J.; and other UV cure adhesives. Once the fibers 34 at the input and output ends 38, 40 are arranged and secured, the end surfaces of the fibers 34 at both the input and output ends 38, 40 are prepared for light propagation using any conventional technique, such as cleaving, polishing, etc.

The above describes a collection/filter system 30 in terms of a two-dimensional pattern 42 having transmissive areas created by fibers 34 and non-transmissive areas created by the spaces between the fibers 34. However, the present invention is not limited to the strict black and white pattern suggested by the above-described transmissive and non-transmissive areas and shown in FIG. 3. In one exemplary embodiment, the power output by the fibers 34 at output end 40 may be varied to create a two-dimensional grayscale pattern that includes one or more shades of gray in between the black and white extremes.

Figure 4:
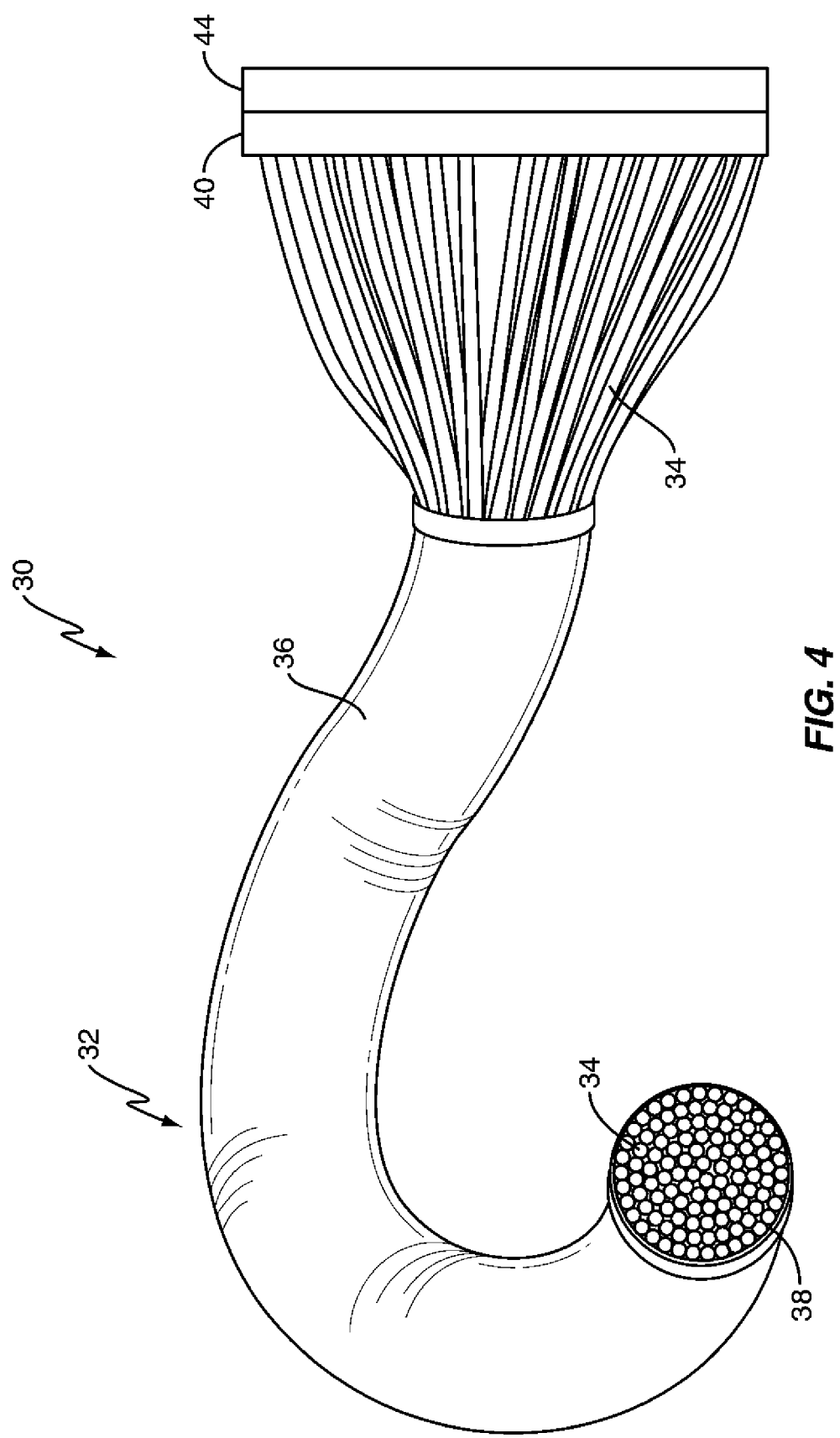
FIG. 4 shows another exemplary spatial filter that includes an optional filter downstream of the output end of the fiber bundle according to the present invention.

For example, a second filter 44 may be positioned proximate output end 40 to attenuate light output by one or more of the fibers 34, as shown in FIG. 4. In this embodiment, the second filter 44 may apply different attenuations to different fiber outputs. The second filter 44 may use any known means to attenuate the light. For example, second filter 44 may comprise a mask that includes one or more absorptive areas that align with one or more of the fibers 34 at the output end 40 and absorb a portion of the output light. According to another example, second filter 44 may be a polarization mask that includes one or more polarizing areas that align with one or more of the fibers 34 at the output end 40 and polarize the light output by the fibers 34. Regardless, positioning the second filter 44 proximate the output end 40 of fiber bundle 32 varies the light output by the fibers 34 to convert the light output by the transmissive areas of the output end 40 into a grayscale pattern with variable relative power levels.

According to another exemplary embodiment, fibers 34 may be selected to create the desired grayscale pattern. For example, instead of using fibers 34 that are all designed to have the same optical characteristics, i.e., attenuation, polarization, etc., different fibers 34 in the fiber bundle 32 may be selected from different groups of fibers designed to have different optical characteristics. Exemplary groups of fibers include single mode fibers, multi-mode fibers, polarization maintaining fibers, graded index (GRIN) fibers, etc. In addition, exemplary groups of fibers may include different subsets of a particular type of fiber designed to have different optical characteristics, such as different polarization maintaining fibers, different GRIN fibers, etc. In any event, selecting different fibers designed to have different optical characteristics for the fiber bundle creates a grayscale pattern in the light output by fibers 34 at the output end 40.

The collection/filter system 30 described herein uses multiple fibers 34 to improve the collection efficiency and to create the desired coded aperture. The collection efficiency is directly related to the number of fibers 34 in fiber bundle 32. As discussed above, the number of fibers is largely driven by the number of transmissive areas in the coded aperture. The arrangement of the fibers at input end 38 also impacts the collection efficiency. For example, tightly packing the fibers 34 at input end 38 such that adjacent fibers contact each other reduces the amount of dead area in the input end 38 that cannot collect light. However, because each fiber includes a core surrounded by a cladding, and because the cores of the fibers collect the majority of the light 7 radiated from the sample 5, the size of the cladding directly impacts how closely the fibers 34 can be packed at the input end 38, and therefore, directly impacts the collection efficiency of the input end 38. To address this problem, the size of the cladding may be a factor when selecting fibers 34 for fiber bundle 32. Alternatively, before the fibers 34 are packed into the input end 38, at least a portion of the cladding may be removed from some or all of the fibers 34 to allow the fibers 34 at the input end 38 to be packed more closely together.

To illustrate, consider the following example. A conventional single mode fiber has a 9 μm diameter core and a 125 μm diameter cladding, where the core collects the majority of the light coupled into the fiber. Based on the size of this exemplary single mode fiber, adjacent fiber cores within a packed input end 38 are separated by at least 116 μm of cladding. As a result, the area of input end 38 is dominated by the cladding. For the exemplary single mode fiber above, the cores represent less than 1% of the total area of an input end 38 packed with the conventional single mode fibers. This limits the collection efficiency of input end 38. However, by reducing the size of the cladding, the cores may be packed more closely together, and therefore, may represent a larger portion of the overall input area. For example, assume the fibers have a 9 μm core diameter and a 20 μm cladding diameter. For this example, adjacent fiber cores can be separated by a minimum of 11 μm, and the cores comprise more than 20% of the area of the input end 38. Therefore, by reducing the size of the cladding, either by selecting fibers with smaller diameters or by actively removing at least a portion of the cladding from some or all of the fibers 34, the fibers 34 at the input end 38 may be more closely packed together, which allows a larger percentage of the area of the input end 38 to collect light, leading to a higher collection efficiency.

It will be appreciated that it may also be beneficial to reduce the size of the cladding of one or more fibers 34 at the output end 40. For example, if the desired number of fibers 34 arranged in the desired two-dimensional pattern 42 takes up an undesirably large area, the area of output end 40 may be reduced by reducing the cladding size of one or more of the fibers 34. Further, removing some or all of the cladding from adjacent fibers removes any undesirable space between the fiber cores, and therefore, improves the performance of the coded aperture.

Figure 5:
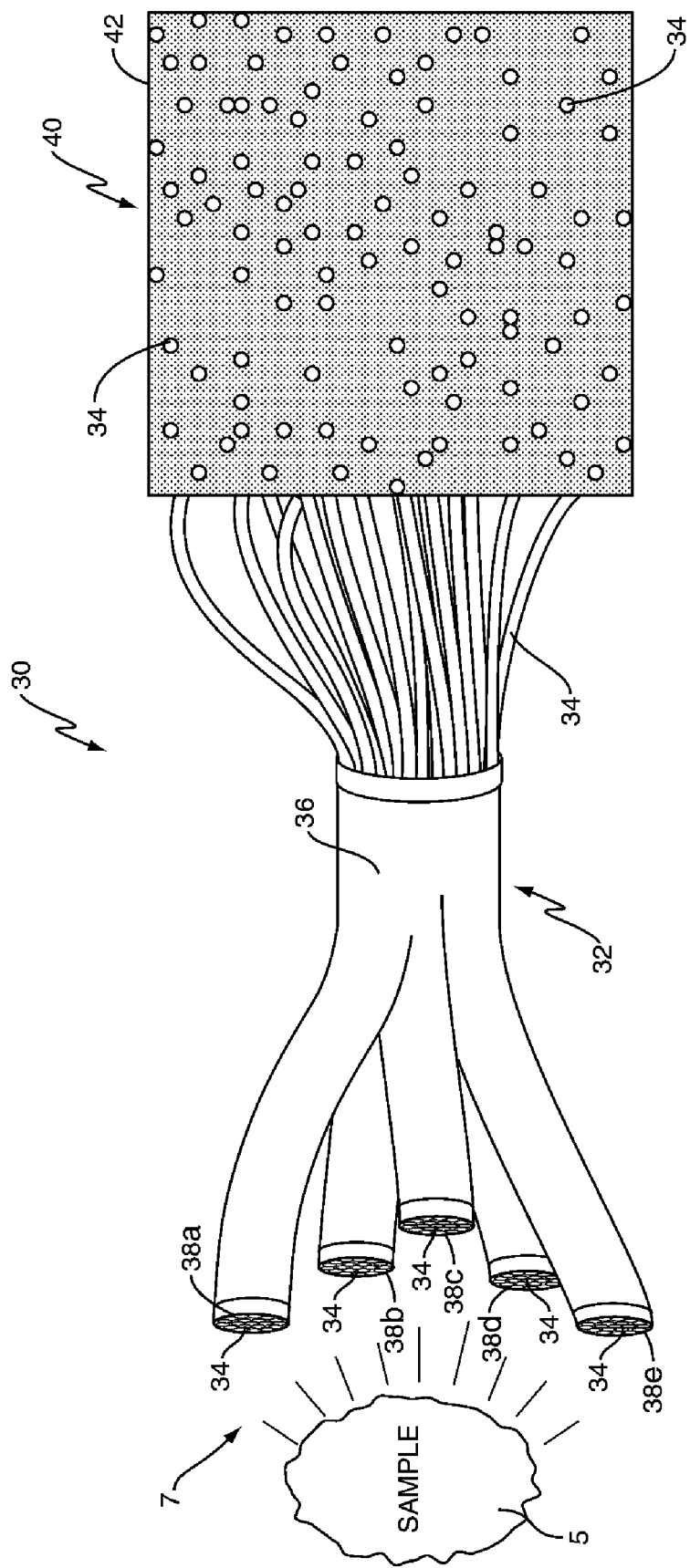
FIG. 5 shows another exemplary spatial filter according to the present invention.

Collection/filter system 30 may further improve the collection efficiency of input end 38 by separating the fibers 34 at the input end 38 into two or more subset ends 38a, 38b, etc., where each subset end includes two or more of the fibers 34. FIG. 5 illustrates one exemplary collection/filter system 30 having five subset ends 38a-38e. As shown in FIG. 5, these subset ends 38a-38e may be arranged proximate different areas of a sample 5 in order to collect light 7 radiating from different areas or regions of the sample 5. In so doing, the collection/filter system 30 may collect more of the radiated light 7. Further, because different areas of the sample may have different characteristics, and therefore may radiate light differently, the multiple subset input ends 38a-38e shown in FIG. 5 may be used to capture different light samples related to different areas on the sample 5.

Figure 6:
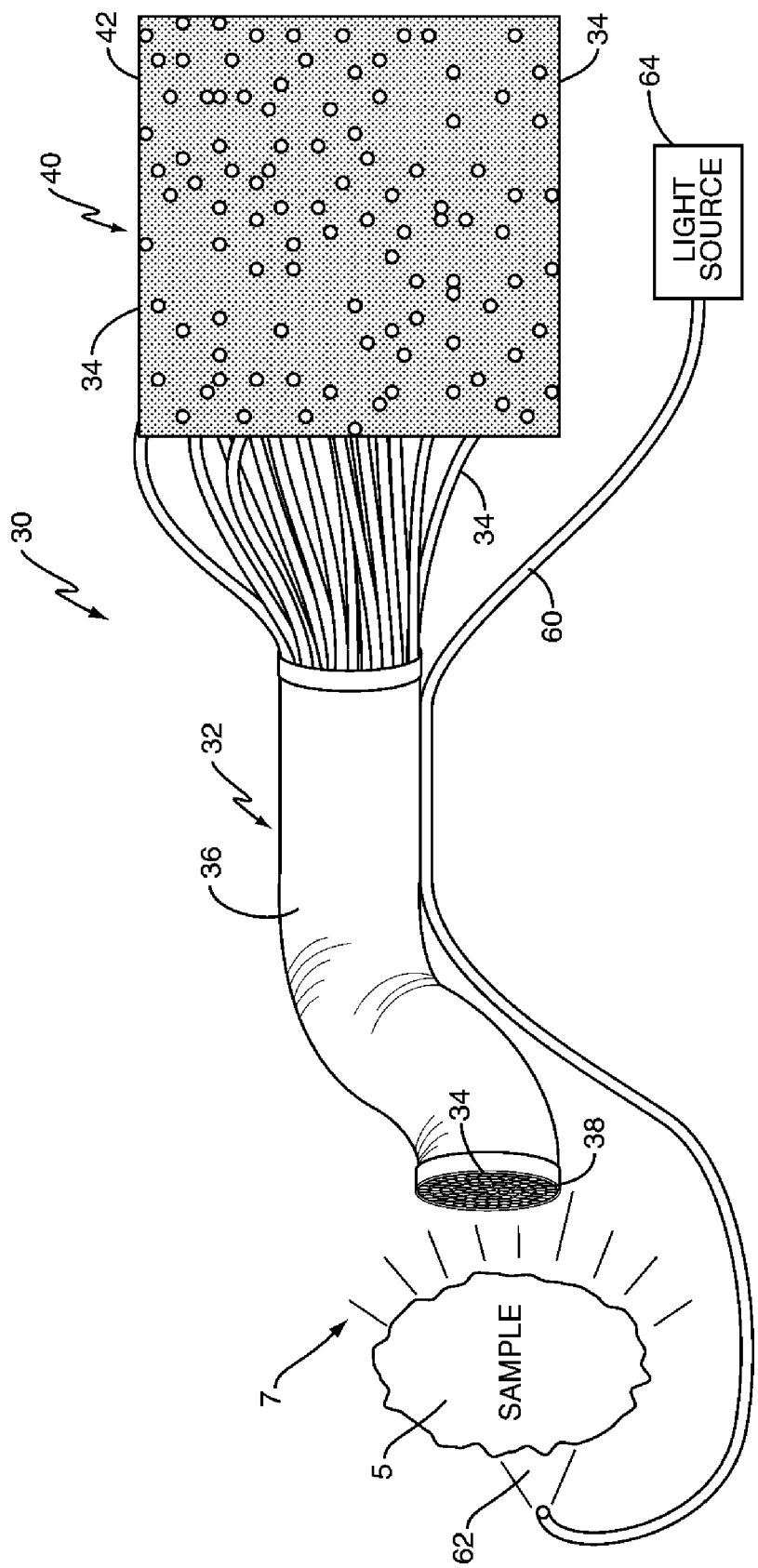
FIG. 6 shows an illumination system associated with a spatial filter according to the present invention.

The above describes a collection/filter system 30 in terms of a plurality of fibers 34 within a fiber bundle 32 that collect and spatially filter radiated light 7. The collection/filter system 30 described above may further include one or more illumination fibers 60 associated with the fiber bundle 32 to illuminate the sample 5. FIG. 6 illustrates one example of this embodiment. As shown in FIG. 6, illumination fiber(s) 60 illuminate sample 5 with light 62 coupled from a light source 64, such as a laser, light emitting diode, etc. In one exemplary embodiment, at least a portion of the illumination fiber(s) 60 may be disposed within the jacket 36 of fiber bundle 32 (not shown). Alternatively, at least a portion of the illumination fiber(s) 60 may be disposed proximate to, adjacent to, or otherwise associated with the fiber bundle 32 as shown in FIG. 6. It will be further appreciated that the illumination fiber(s) 60 and/or light source 64 may be disposed within the spectrometer 10 but separate from collection/filter system 30 or may be disposed outside of spectrometer 10. In any event, using a fiber to provide light to illuminate the sample 5 enables the light source 64 to be remotely located from the sample 5. Further, the flexibility of the illumination fiber(s) 60 enable illuminating the sample 5 from any angle.

The collection/filter system 30 described herein may also correct distortion caused by one or more spectrometer components, such as lens systems 22, 24 and/or dispersion system 26. For example, dispersion system 26 may distort the coded aperture image by causing the coded aperture image to appear curved. Exemplary types of distortion include spectral linear curvature, pincushion distortion, barrel distortion, keystone distortion, chromatic distortion, etc.

Collection/filter system 30 may compensate for this distortion by pre-distorting the two-dimensional pattern 42 according to a distortion compensation function and arranging the fibers 34 according to the distorted two-dimensional pattern. FIG. 7 illustrates an exemplary output end 40 before and after applying distortion. The output end 40 on the left-hand side of FIG. 7 represents an exemplary output end 40 with fibers 34 arranged according to a non-distorted two-dimensional pattern 42. Contrastingly, the right-hand side of FIG. 7 illustrates a distorted output end 46 and represents how distorting columns of the two-dimensional pattern 42 based on a distortion compensation function and positioning the fibers in the distorted two-dimensional pattern creates a distorted output end 46 that compensates for system distortion in the optical spectrometer 10.

The distortion compensation function generally represents the inverse of measured or calculated spectrometer distortion. Therefore, by arranging the fibers 34 according to the distorted two-dimensional pattern, the output end 40 of fiber bundle 32 represents a distorted coded aperture that outputs distorted spatially filtered light. It will be appreciated that even though fibers 34 are arranged according to the distorted two-dimensional pattern, the arrangement of the fibers 34 at the output end 40 still corresponds to the pre-determined coded aperture function.

Because the distorted two-dimensional pattern applies the inverse of the system distortion to the filtered light, the distorted two-dimensional pattern reverses the effects of the system distortion. For example, assume that the system distortion curves the coded aperture image such that the coded aperture image exhibits a slight c-shaped curve at the detector array 50. To compensate for this spectral line curvature distortion, the two-dimensional pattern 42 may be distorted such that the arranged fibers exhibit a slight backward c-shape (see FIG. 7). This causes the spatially filtered light to also exhibit a slight backward c-shape. When this filtered light passes through the lens and dispersion systems 22, 24, 26, the curved distortion caused by the lens and dispersion systems straightens the oppositely curved, pre-distorted light. As a result, the coded aperture images captured at the detector array 50 are straight and have a reduced amount of distortion.

It will be appreciated that while the above example discusses and illustrates distorting columns of the two-dimensional pattern 42 to compensate for distortion, the present invention is not so limited. One or more columns and/or rows of the two-dimensional pattern 42 may be distorted according to any distortion compensation function to compensate for any known distortion, including pincushion distortion, barrel distortion, keystone distortion, chromatic distortion, or any combination thereof. Further, the distortion compensation described herein applies to any spatial filter output area, including a slit.

The above-described collection/filter system 30 improves collection efficiency over conventional collection optics and spatial filter systems by using a large number of fibers packed into an input end of a fiber bundle to collect light radiated from a sample. In addition, the above-described collection/filter system 30 removes the need for a separate spatial filter and reduces size restrictions by arranging the fibers 34 used to collect the light at an output end of the fiber bundle in a two-dimensional pattern 42.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of spatially filtering light radiating from a sample, the method comprising:
    collecting light radiating from the sample with an input end of a fiber bundle comprising a plurality of optical fibers; and
    spatially filtering the collected light by outputting the collected light from an output end of the fiber bundle, wherein the plurality of fibers at the output end are arranged according to a two-dimensional pattern corresponding to a pre-determined coded aperture function, wherein at least one column of the two-dimensional pattern includes at least two fibers from the ouput end of the fiber bundle, wherein at least one row of the two-dimensional pattern includes at least two fibers from the output end of the fiber bundle, and wherein each column of the two-dimensional pattern is orthogonal under an inner product transformation.

2. The method of claim 1 wherein the two-dimensional pattern corresponding to the pre-determined coded aperture function is distorted according to a distortion compensation function.

3. The method of claim 2 wherein the two-dimensional pattern comprises a grid pattern having a plurality of columns and rows, and wherein at least one of the columns and the rows are shaped according to the distortion compensation function.

4. The method of claim 1 further comprising varying a power level of light output by one or more of the plurality of fibers at the output end.

5. The method of claim 4 wherein varying the power level of light output by one or more of the plurality of fibers at the output end comprises attenuating the light output by one or more of the plurality of optical fibers at the output end of the fiber bundle using a second filter positioned proximate the output end of the fiber bundle.

6. The method of claim 1 wherein the input end of the fiber bundle comprises two or more separate subset input ends, each subset input end comprising two or more of the plurality of optical fibers, and wherein collecting light radiating from the sample comprises positioning different subset input ends of the fiber bundle proximate different areas of the sample to collect light radiating from different areas of the sample.

7. The method of claim 1 further comprising:
    associating one or more illumination fibers with the fiber bundle;
    coupling light from a light source into the one or more illumination fibers; and
    illuminating the sample with incident light provided by the light source via the one or more illumination fibers.

8. The method of claim 1 wherein the coded-aperture function defines a plurality of transmissive areas and a plurality of non-transmissive areas, and wherein the two-dimensional pattern arranges the plurality of optical fibers at the output end such that the plurality of optical fibers correspond to the plurality of transmissive areas and such that areas between the plurality of optical fibers correspond to the plurality of non-transmissive areas.

9. The method of claim 1 wherein each of the plurality of fibers comprise a core surrounded by at least a portion of a cladding, and wherein the plurality of fibers at the input end are arranged such that first and second cores from adjacent first and second fibers are separated by a size of the corresponding claddings.

10. A method of manufacturing a spatial filter comprising:
    positioning a plurality of optical fibers at a first end of a fiber bundle according to a two-dimensional pattern occupying a first area and corresponding to a pre-determined coded aperture function, wherein at least one column of the two-dimensional pattern includes at least two fibers from the output end of the fiber bundle, wherein at least one row of the two-dimensional pattern includes at least two fibers from the output end of the fiber bundle, and wherein each column of the two-dimensional pattern is orthogonal under an inner product transformation;
    affixing the plurality of optical fibers in the two-dimensional pattern; and
    packing a plurality of fibers at a second end of the fiber bundle, opposite the first end, into a second area smaller than the first area.

11. The method of claim 10 wherein the two-dimensional pattern comprises a grid pattern having a plurality of columns and rows.

12. The method of claim 11 wherein positioning the plurality of optical fibers comprises distorting at least one of the columns and rows of the grid pattern according to a pre-determined distortion compensation function prior to affixing the plurality of optical fibers in the two-dimensional pattern.

13. The method of claim 10 further comprising selecting each of the plurality of fibers in the fiber bundle from two or more different groups of fibers, wherein fibers in each of the different groups of fibers are designed to have different attenuations.

14. The method of claim 10 further comprising positioning a filter proximate the first end of the fiber bundle, wherein the filter attenuates light output by one or more of the plurality of optical fibers at the first end of the fiber bundle.

15. The method of claim 10 further comprising separating the second end of the fiber bundle into two or more subset ends, each subset end comprising two or more of the plurality of optical fibers.

16. The method of claim 10 further comprising associating one or more illumination fibers with the fiber bundle, said one or more illumination fibers configured to illuminate a sample by channeling illumination light provided by a light source to the sample.

17. The method of claim 10 wherein each of the plurality of fibers comprises a core surrounded by a cladding, and wherein packing the plurality of fibers at the second end of the fiber bundle comprises packing the plurality of fibers at the second end such that first and second cores from first and second adjacent fibers are separated by a thickness of the corresponding claddings.

18. The method of claim 17 further comprising removing at least a portion of the cladding from one or more of the plurality of fibers at the second end before packing the fibers into the second end.

19. The method of claim 10 wherein each of the plurality of fibers comprises a core surrounded by a cladding, the method further comprising removing at least a portion of the cladding from one or more of the plurality of fibers at the first end before positioning the plurality of fibers in the two-dimensional pattern.

20. The method of claim 10 wherein the first area is at least 1.3 times larger than the second area.

21. The method of claim 10 further comprising preparing an end surface of each of the plurality of fibers at the first and second ends for light propagation using at least one of a cleaving and a polishing technique.

22. An optical spatial filter comprising:
a fiber bundle comprising a plurality of optical fibers;
wherein said plurality of optical fibers are positioned at an output end of the fiber bundle according to a two-dimensional pattern occupying a first area and corresponding to a pre-determined coded aperture function;
wherein at least one column of the two-dimensional pattern includes at least two fibers from the output end of the fiber bundle;
wherein at least one row of the two-dimensional pattern includes at least two fibers from the output end of the fiber bundle;
wherein each column of the two-dimensional pattern is orthogonal under an inner product transformation; and
wherein said plurality of optical fibers at an input end of the fiber bundle, opposite said output end, are packed into a second area smaller than the first area.

23. The optical spatial filter of claim 22 wherein the two-dimensional pattern comprises a grid pattern having a plurality of columns and rows.

24. The optical spatial filter of claim 23 wherein the two-dimensional pattern corresponding to the pre-determined coded aperture function is distorted according to a distortion compensation function such that at least one of the columns and rows are distorted according to the distortion compensation function.

25. The optical spatial filter of claim 22 wherein the coded-aperture function defines a plurality of transmissive areas and a plurality of non-transmissive areas, and wherein the two-dimensional pattern arranges the plurality of optical fibers at the output end such that the plurality of optical fibers correspond to the plurality of transmissive areas and such that areas between the plurality of optical fibers correspond to the plurality of non-transmissive areas.

26. The optical spatial filter of claim 22 further comprising a second filter positioned proximate the output end of the fiber bundle, said second filter configured to attenuate light output by one or more of the plurality of optical fibers at the output end of the fiber bundle.

27. The optical spatial filter of claim 22 wherein the plurality of optical fibers are selected from two or more different groups of fibers, wherein fibers in each of the different groups are designed to have different attenuations.

28. The optical spatial filter of claim 22 wherein the input end comprises two or more separate subset input ends, each subset input end comprising two or more of the plurality of optical fibers.

29. The optical spatial filter of claim 22 further comprising one or more illumination fibers associated with the fiber bundle, said one or more illumination fibers configured to illuminate a sample by channeling illumination light provided by a light source to the sample.

30. The optical spatial filter of claim 22 wherein the first area is at least 1.3 times larger than the second area.

31. The optical spatial filter of claim 22 wherein each of the plurality of fibers comprise a core surrounded by at least a portion of a cladding, and wherein the plurality of fibers at the input end are arranged such that first and second cores from adjacent first and second fibers are separated by a thickness of the corresponding claddings.

32. The optical spatial filter of claim 22 wherein the plurality of optical fibers comprise a plurality of multi-mode fibers.

33. The optical spatial filter of claim 22 wherein the plurality of optical fibers comprise a plurality of single-mode fibers.

34. An optical spectrometer comprising:
a collection filter system configured to collect incident light radiating from a sample and spatially filter the collected light according to a pre-determined coded aperture function, the collection filter system comprising:
a fiber bundle comprising a plurality of optical fibers;
wherein said plurality of optical fibers are positioned at an output end of the fiber bundle according to a two-dimensional pattern occupying a first area and corresponding to the pre-determined coded aperture function; and
wherein said plurality of optical fibers at an input end of the fiber bundle, opposite said output end, are packed into a second area smaller than the first area;
a two-dimensional detector array; and
a dispersion system disposed between the collection filter system and the detector array, said dispersion system configured to shift images of the two-dimensional pattern in a wavelength dependent fashion onto the detector array.

35. The optical spectrometer of claim 34 wherein the two-dimensional pattern comprises a grid pattern having a plurality of columns and rows, and wherein the two-dimensional pattern corresponding to the pre-determined coded aperture function is distorted according to a distortion compensation function such that at least one of the columns and rows are distorted according to the distortion compensation function to compensate for distortion caused by optical characteristics of the optical spectrometer.

36. The optical spectrometer of claim 34 further comprising a filter positioned proximate the output end of the fiber bundle, said filter configured to attenuate light output by one or more of the plurality of optical fibers at the output end of the fiber bundle.

37. The optical spectrometer of claim 34 wherein the plurality of optical fibers are selected from two or more different groups of fibers, wherein fibers in each of the different groups are designed to have different attenuations.

38. The optical spectrometer of claim 34 further comprising:
a light source; and
one or more illumination fibers associated with the fiber bundle, said one or more illumination fibers coupled to the light source and configured to illuminate the sample with light provided by the light source.

39. The optical spectrometer of claim 34 wherein the first area is at least 1.3 times smaller than the second area.

40. The optical spectrometer of claim 34 further comprising a second filter disposed proximate the output end of the fiber bundle, said second filter configured to further spatially filter light output by the output end.

41. A method of processing light comprising:
collecting light radiating from a sample with an input end of a fiber bundle comprising a plurality of optical fibers;
spatially filtering the collected light by outputting the collected light from an output end of the fiber bundle, wherein the plurality of fibers at the output end are arranged according to a two-dimensional pattern corresponding to a pre-determined coded aperture function;
dispersing the filtered light to shift images of the two-dimensional pattern in a wavelength dependent fashion onto a two-dimensional detector array; and
processing one or more output signals corresponding to one or more detected images to identify one or more spectral characteristics of the light.

42. The method of claim 41 wherein the two-dimensional pattern corresponding to the pre-determined coded aperture function is distorted according to a distortion compensation function based on a known system distortion such that at least one of a column and a row of the two-dimensional pattern is distorted based on the distortion compensation function to compensate for distortion present in the detected images.

43. The method of claim 41 further comprising varying a power level of light output from one or more of the plurality of optical fibers at the output end.

44. The method of claim 43 wherein varying the power level of light output by one or more of the plurality of optical fibers comprises attenuating the light output by one or more of the plurality of optical fibers at the output end of the fiber bundle using a filter positioned proximate the output end of the fiber bundle.

45. The method of claim 41 wherein the input end of the fiber bundle comprises two or more subset input ends, each subset input end comprising two or more of the plurality of optical fibers.

46. The method of claim 41 further comprising:
associating one or more illumination fibers with the fiber bundle;
coupling light from a light source into the one or more illumination fibers; and
illuminating the sample with incident light provided by the light source via the one or more illumination fibers.

47. The method of claim 41 wherein each of the plurality of fibers comprise a core surrounded by at least a portion of a cladding, and wherein the plurality of fibers at the input end are arranged such that first and second cores from adjacent first and second fibers are separated by a thickness of the corresponding claddings.

48. The method of claim 41 further comprising filtering the spatially filtered light using a second filter disposed proximate the output end of the fiber bundle.

* * * * *